United States Patent [19]
Montrose

[11] Patent Number: 5,117,721
[45] Date of Patent: Jun. 2, 1992

[54] METHOD OF FORMING PERFORATING RULE AND BLADES

[76] Inventor: Franklin C. Montrose, 3801 NE. 18th Ave., Oakland Park, Fla. 33334

[21] Appl. No.: 604,251

[22] Filed: Oct. 29, 1990

[51] Int. Cl.⁵ .............................................. B21K 5/20
[52] U.S. Cl. .................................... 83/660; 76/107.8; 83/676; 83/678; 83/854
[58] Field of Search ................. 83/678, 660, 676, 835, 83/854; 76/107.8, 112

[56] References Cited

U.S. PATENT DOCUMENTS

| | | | |
|---|---|---|---|
| 1,177,057 | 3/1916 | Robinson | 76/112 X |
| 1,712,034 | 5/1929 | Fromm | 76/112 |
| 2,842,202 | 7/1958 | Boyd | 83/678 |
| 5,022,299 | 6/1991 | Fischer et al. | 83/676 |

Primary Examiner—Mark Rosenbaum
Assistant Examiner—Kenneth E. Peterson
Attorney, Agent, or Firm—Malloy, Downey & Malloy

[57] ABSTRACT

A method of forming perforating rule and blades of the type used in business form machines and other paper processing machines to apply perforations to business forms or various other paper products wherein an impression roll having hardened impression teeth spaced equally about an outer circumferential surface thereof is pressed into contact with a blade or rule such that the hardened teeth bite into a sharpened edge of the blade or rule forming equally spaced perforating teeth therealong. The resulting product of the process is a perforating rule or blade having tapered perforating teeth equally spaced with gaps therebetween wherein a pillow of displaced material is formed at the base of the gaps being structured and configured to resist residue buildup while facilitating ease of stripping of the rule or blade from the perforated forms.

15 Claims, 1 Drawing Sheet

U.S. Patent     June 2, 1992     5,117,721
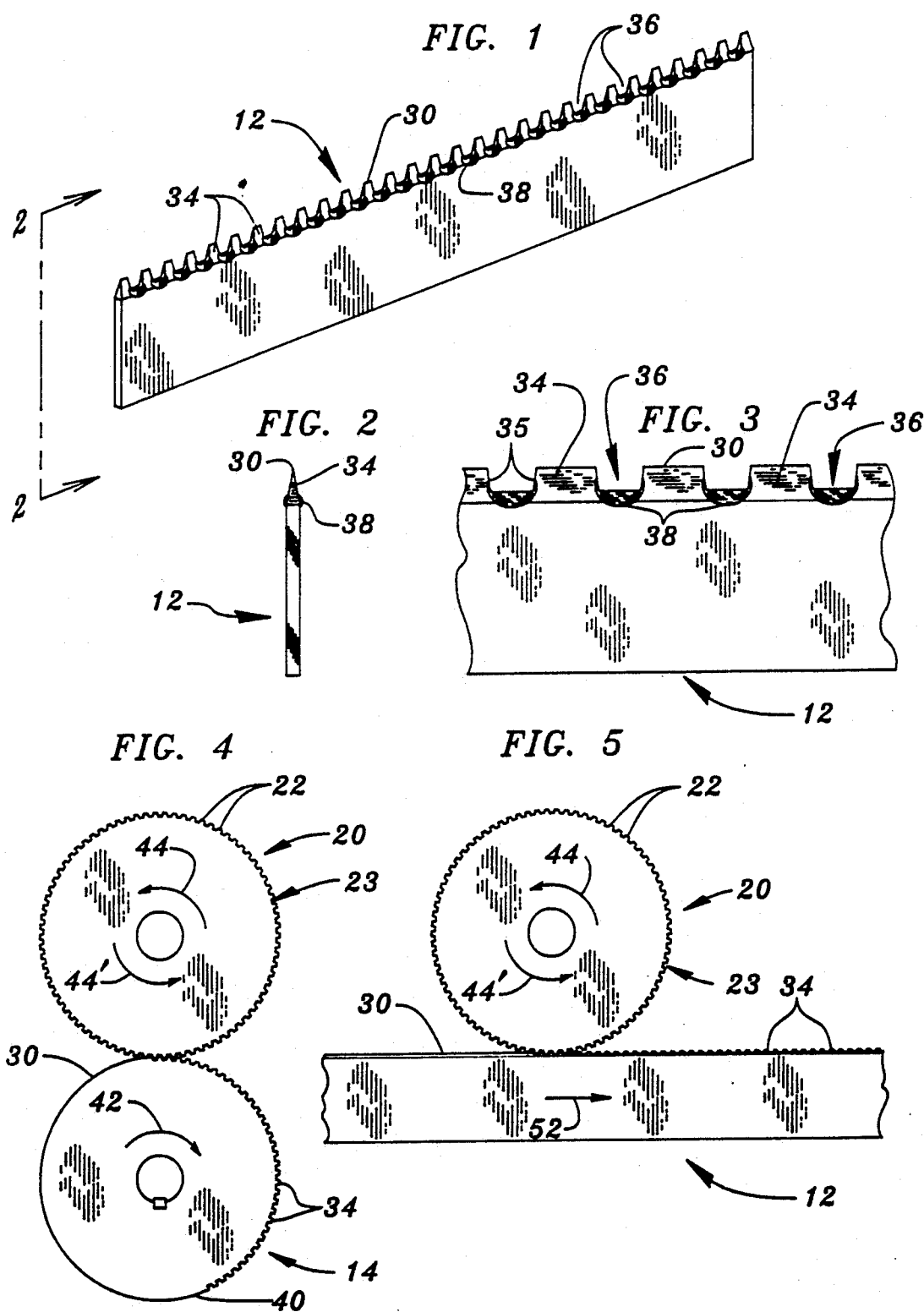

METHOD OF FORMING PERFORATING RULE AND BLADES

BACKGROUND OF THE INVENTION

1. Field of the Invention

A method of forming perforating teeth in a perforating blade or rule for use in business form machines and other paper processing machines for applying perforations to business forms or other paper products.

2. Description of the Related Art

Perforating rule and blades are used in business form machines in order to apply perforations to business forms. Generally, perforating rule is made straight while perforating blades are circular, both being made in a variety of sizes. In normal use, the perforating rule and blades are required to be replaced quite often and therefore, they are packaged and purchased in large quantities and are readily disposable after use.

The perforating rule and blades include perforating teeth formed along a sharpened edge. The teeth are specifically structured and designed to form perforations in the business forms by either positioning the forms under the perforating rule where they are stamped or by feeding the forms through the machine so as to pass into contact with a rotating perforating blade which applies the perforations to the forms.

The perforating teeth in the perforating rule and blades in the related art are conventionally formed with punches and dies. This technique has been found to be expensive in producing large quantities because it limits production speed. Additionally, forming the perforating teeth with punches and dies creates burrs and distortion in the rule or blades making them undesirable for use in the business form machines. Specifically, the burrs created from punches and dies results in snagging of extraneous fiber making it difficult to strip the rule and blades from the perforated forms.

Included in the related art are U.S. Pat. Nos. 4,010,666 and 3,973,452 both of which disclose a cold rolled steel perforating blade wherein the blade height to blade thickness ratio is a critical aspect, resulting in proper contact with a mating anvil.

U.S. Pat. No. 3,248,987 discloses a rotary cutter, wherein a blade having no teeth is formed from an unhardened flat ring squeezed between matched dies. Additionally, U.S. Pat. Nos. 3,554,070; 3,147,658; and 2,842,202 disclose a flexible L-shaped perforating blade which is attached to a cylinder with an adhesive. The perforating blades in these patents include a variety of desirable teeth configurations.

Finally, U.S. Pat. No. 4,745,835 discloses a perforating tooth configuration for creating extremely fine perforations wherein wire type electrode discharge machinery or lasers are used for cutting the teeth.

Accordingly, in view of the above patents and the problems associated in the related perforating rule and blade art, there still exists a need for perforating rule and blades which can be produced at a much greater rate of speed at a substantially lower cost wherein the resulting rule and blades include sharp, smooth teeth having smooth tapered sides adapted to be easily stripped from perforated forms. Additionally, there is a need for perforating rule and blades in which the teeth are stronger and adapted to last longer having less tendency to distort during use.

SUMMARY OF THE INVENTION

The present invention relates to a method of forming perforating rule and blades for use in business form machines in applying perforations to business forms. Specifically, the method of the present invention includes rotating a circular impression roll formed of a hardened material and having hardened impression teeth spaced equally about an outer circumferential surface thereof. A perforating rule or blade blank formed of a less hardened material is directed into contact with the impression teeth on the rotating impression roll causing the teeth to bite into a sharpened edge of the rule or blade blank. As the spaced impression teeth on the impression roll bite into the sharpened edge, a portion of the material on the blank is displaced at spaced intervals along the sharpened edge forming pillows of material at the base of gaps formed therealong. At the same time, perforating teeth are formed along the sharpened edge, being defined by the non-displaced material which falls between the spaced impression teeth as the impression roll rotates and rolls across the sharpened edge. The resulting perforating teeth formed from the impression roll have a minimum height making them stronger for extended use in business form machines. Additionally, the formed perforating teeth include smooth, tapered sides which allow the rule or blades to be stripped from the perforated forms while resisting residue buildup between the teeth.

The pillows of displaced material formed at the base of the gaps between the teeth provide added strength to the teeth preventing bending or distortion during use, thus adding to the life of the rule or blade and the accuracy of the resulting folds. Additionally, the pillows include a smooth rounded outer surface which discourages hangups during perforating while additionally resisting residue buildup between the teeth. The smooth configuration of the pillows further add to the ease of stripping the rule or blades from the perforated forms.

BRIEF DESCRIPTION OF THE DRAWINGS

For a fuller understanding of the nature of the present invention, reference should be had to the following detailed description taken in connection with the accompanying drawings, in which:

FIG. 1 is a perspective view of the perforating rule formed by the process of the present invention.

FIG. 2 is an end plan view taken along line FIG. 2—FIG. 2 of FIG. 1.

FIG. 3 is a side view in cutaway illustrating a perforating teeth configuration formed by the method of the present invention.

FIG. 4 is a side plan view illustrating an impression roll forming perforating teeth in a perforating blade using the method of the present invention.

FIG. 5 is a side plan view of the impression roll forming perforating teeth along a cutting edge of perforating rule.

Like reference numerals refer to like parts throughout the several views of the drawings.

DETAILED DESCRIPTION OF THE DRAWINGS

The present invention is directed towards a method of forming perforating teeth in perforating rule and blades as commonly used in business form machines and other paper and label processing machines for applying perforations to business forms or other paper products.

Additionally, the present invention includes the resulting product of the method including the formed perforating rule 12 and perforating blade 14 as best illustrated in FIGS. 1 and 4.

Generally, the perforating rule 12 is of an elongate strip configuration while the perforating blade 14 comprises a circular disc like configuration.

The method of the present invention includes rotating a circular impression roll 20 formed of a hardened material and having hardened polished impression teeth 22 spaced equally about its outer circumferential surface 23. A perforating blade or rule having a sharpened edge 30 and formed of a less hardened material than that of the impression roll 20 is moved into contact with the impression roll 20. The sharpened edge 30 on the perforating blade or rule is directed into contact with the impression teeth 22 on the impression 20 such that the impression teeth bite into the sharpened edge as the rule or blank is moved allowing the impression teeth to walk along the sharpened edge while displacing material at equal spaced intervals along the sharpened edge thereby forming perforating teeth 34 and gaps 36 in alternating sequence. The gaps 36 represent the area in which material was displaced by the impression teeth 22 leaving the perforating teeth 34 as a result of the spacing between the impression teeth 22. As best shown in FIGS. 2 and 3, the material displaced in the gaps 36 forms a pillow 38 at the base of the gap having a substantially rounded smooth outer surface extending on opposite sides of the rule or blade. The pillows 39 provide support and reinforcement to the base of the perforating teeth 34 thereby preventing bending or distortion during use and thus adding to the life of the rule or blade and the accuracy of the resulting folds. The formed perforating teeth 34 include tapered sides 35 which have a clean smooth finish eliminating snagging and accumulation of extraneous fiber during perforating.

With reference to FIG. 4, the sharpened edge 30 is disposed about an outer circumferential edge 40 of the perforating blade 14. The perforating teeth 34 are formed on the perforating blade 14 by bringing the sharpened edge 30 on the outer circumferential edge 40 into contact with the impression teeth 22 of the impression roll 20 while allowing the blade 14 to rotate in a counter direction as illustrated by the arrow 42 in response to the biting engagement of the impression teeth 22 as the impression roll 20 rotates in the direction of the arrows 44 and 44'.

With reference to FIG. 5, the sharpened edge 30 is disposed along a top edge 50 on the perforating rule 12. The perforating teeth 34 are formed along the sharpened edge 30 by directing the rule 12 in a linear direction as indicated by the arrow 52 while the impression teeth 22 bite into the sharpened edge 30 as the impression roll rotates in the direction of the arrows 44 and 44'.

While the present invention has been disclosed in connection with a preferred embodiment thereof, it should be understood that there may be other embodiments which fall within the spirit and scope of the invention as defined by the following claims.

What is claimed is:

1. A method of forming perforated rule or blades for use in business form machines to apply perforations to business forms; the method comprising the steps of:

rotating a circular impression roll having a substantially flat, disc shaped configuration adapted to be rotated about a center thereof and formed of a hardened material, said impression roll including hardened impression teeth equally spaced about an outer circumferential surface thereof, directing a planar blank formed of a less hardened material into contact with said outer circumferential surface of said impression roll such that said impression teeth bite into a sharpened edge of said blank, displacing a portion of said less hardened material of said blank disposed along said sharpened edge so as to form a pillow of material at a substantially flat base of a gap formed in said sharpened edge by an individual one of said impression teeth, said substantially flat base being substantially parallel to said sharpened edge, moving said blank at a speed corresponding with a rotational speed of said impression roll so that said outer circumferential surface walks along said sharpened edge with said impression teeth forming a plurality of said gaps along said sharpened edge in spaced relation to one another, simultaneously forming perforating teeth along said sharpened edge between said plurality of gaps in such a manner wherein said sharpened edge is disposed on a free distal end of each of said perforating teeth and extends in a plane substantially coplanar with said blank.

2. The method as in claim 1 wherein said perforating teeth formed along said sharpened edge include tapered sides extending between said sharpened edge and said base of said gap, wherein each of said perforating teeth gradually increases in width between said sharpened edge and said base.

3. The method as in claim 2 wherein said pillow of material formed at said base of each of said plurality of gaps is disposed on opposite sides of said blank in supporting relation to two of said perforating teeth on opposite sides of each gap so as to provide additional strength thereto.

4. The method as in claim 3 wherein said blank comprises a substantially flat elongate strip of said less hardened material having said sharpened edge disposed along a top edge thereof.

5. The method as in claim 4 wherein said elongate strip includes a generally rectangular configuration.

6. The method as in claim 5 wherein said step of moving said blank comprises moving said elongate strip in a linear direction such that said impression teeth on said impression roll are disposed in engaging, biting relation with said sharpened edge along said top edge of said blank.

7. The method as in claim 3 wherein said blank comprises a substantially flat, circular blade having said sharpened edge disposed about an outer circumferential edge thereof.

8. The method as in claim 7 wherein said step of moving said blank comprises rotating said circular blade with said impression teeth on said impression roll disposed in engaging, biting relation with said sharpened edge of said circular blade.

9. A perforating article for use in applying perforations to paper products, comprising:

a substantially planar body formed of a hardened material and having a thickness, a plurality of perforating teeth formed along an edge of said body each of said perforating teeth including a sharpened distal edge said tooth edges extending in a plane substantially co-planar with said planar body, a plurality of gaps formed between said perforating teeth in alternating sequence therewith and including a substantially flat base extending along a length between said perforated teeth, a pillow of said hardened material formed at said base of each of said plurality of gaps and disposed in supporting, reinforcing relation to said perforating teeth, said pillow of material at said base of said gap, said pillow of material having a thickness greater than the thickness of the planar body and being structured and disposed so as to add strength and rigidity to said perforating teeth, and said base being substantially parallel to said sharpened distal edge on a free distal end of each of said perforating teeth.

10. A perforating article as in claim 9 wherein each of said perforating teeth include tapered sides extending between said sharpened distal edge and the base of said gap, wherein each of said perforating teeth gradually increases in width from said sharpened distal edge to the base.

11. A perforating article as in claim 10 wherein said tapered sides of said perforating teeth are structured and configured to allow ease of stripping of the perforating article from a perforated product.

12. A perforating article as in claim 11 wherein said pillow of material includes a bulbous configuration extending outwardly and overlapping on opposite sides of said planar body and having a smooth outer surface adapted to resist a buildup of residue at the base of said gaps.

13. A perforating article as in claim 12 wherein said planar body comprises a substantially elongate strip of said hardened material having said perforating teeth and said gaps disposed along a top edge thereof.

14. A perforating article as in claim 13 wherein said elongate strip is of a rectangular configuration.

15. A perforating article as in claim 12 wherein said planar body comprises a circular disc having said perforating teeth and said gaps disposed in alternating sequence about an outer circumferential edge thereof.

* * * * *